United States Patent
Hofström et al.

(10) Patent No.: US 11,917,694 B2
(45) Date of Patent: Feb. 27, 2024

(54) RANDOM ACCESS PROCEDURE

(71) Applicant: Telefonaktiebolaget LM Ericsson (publ), Stockholm (SE)

(72) Inventors: Björn Hofström, Linköping (SE); Jan Christoffersson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/101,658

(22) Filed: Jan. 26, 2023

(65) Prior Publication Data

US 2023/0180302 A1 Jun. 8, 2023

Related U.S. Application Data

(63) Continuation of application No. 17/536,486, filed on Nov. 29, 2021, now Pat. No. 11,601,984, which is a (Continued)

(51) Int. Cl.
*H04W 74/08* (2009.01)
*H04W 24/08* (2009.01)
(Continued)

(52) U.S. Cl.
CPC ....... *H04W 74/0833* (2013.01); *H04W 24/08* (2013.01); *H04W 72/0453* (2013.01); *H04W 72/542* (2023.01)

(58) Field of Classification Search
CPC .......... H04W 74/0833; H04W 24/08; H04W 72/0453; H04W 72/085; H04W 74/008
See application file for complete search history.

(56) References Cited

U.S. PATENT DOCUMENTS 11,601,984 B2 * 3/2023 Hofström .......... H04W 74/0833
2017/0367120 A1 12/2017 Murray et al.
(Continued)

FOREIGN PATENT DOCUMENTS

| EP | 2339890 A1 | 6/2011 |
| JP | 2021503744 A | 2/2021 |
| WO | 2017031676 A1 | 3/2017 |

OTHER PUBLICATIONS

"BWP selection and RA", 3GPP TSG-RAN WG2 #101, Tdoc R2-1803203, Athens, Greece, Feb. 26-Mar. 2, 2018, pp. 1-9.
(Continued)

*Primary Examiner* — Jae Y Lee
(74) *Attorney, Agent, or Firm* — Murphy, Bilak & Homiller, PLLC

(57) ABSTRACT

Embodiments include methods performed by a wireless device for random access to a wireless communications network. Such methods include transmitting a random access preamble in a first uplink (UL) bandwidth part (BWP) of a carrier and selecting a first downlink (DL) BWP of the carrier based on an association between the first UL BWP and the first DL BWP. Such methods include monitoring the first DL BWP for a random access response from the wireless communication network to the transmitted random access preamble. Other embodiments include complementary methods for a base station configured to support random access by wireless devices, as well as wireless devices and base stations configured to perform such methods.

20 Claims, 16 Drawing Sheets

| PRACH configuration index | DL BWP |
|---|---|
| 0 to 10 | DL BWP1 |
| 11 to 14 | DL BWP1 or DL BWP2 |
| 15 to 23 | DL BWP3 |
| 24 to 63 | DL BWP2 or DL BWP3 |

Related U.S. Application Data continuation of application No. 16/348,083, filed as application No. PCT/SE2019/050116 on Feb. 11, 2019, now Pat. No. 11,229,056.

(60) Provisional application No. 62/631,249, filed on Feb. 15, 2018.

(51) Int. Cl.
*H04W 72/0453* (2023.01)
*H04W 72/542* (2023.01)

(56) References Cited

U.S. PATENT DOCUMENTS

| | | |
|---|---|---|
| 2019/0045549 A1 | 2/2019 | Wu |
| 2019/0098667 A1 | 3/2019 | Lai et al. |
| 2019/0132857 A1 | 5/2019 | Babaei et al. |
| 2019/0182716 A1 | 6/2019 | Futaki et al. |
| 2019/0223227 A1 | 7/2019 | Jiang et al. |
| 2019/0246420 A1 | 8/2019 | Park et al. |
| 2020/0213066 A1 | 7/2020 | Ma et al. |
| 2020/0374799 A1 | 11/2020 | Kuang et al. |
| 2020/0382264 A1* | 12/2020 | Aiba ............... H04L 5/0094 |
| 2020/0389922 A1 | 12/2020 | Xu et al. |
| 2021/0368545 A1* | 11/2021 | Xu ............... H04W 74/0833 |

OTHER PUBLICATIONS

"Remaining bandwidth-part issues", 3GPP TSG-RAN WGI 91, R1-1720444, Reno, USA, Nov. 27-Dec. 1, 2017, pp. 1-5.

"The impact of BWP configuration and switching", 3GPP TSG-RAN WG2 NR Ad hoc 1801; R2-1800778; Vancouver, Canada, Jan. 22-26, 2018, pp. 1-8.

"Offline discussion for BWP", 3GPP TSG-RAN WG2 Meeting #100, R2-1714182, Reno, USA, Nov. 27-Dec. 1, 2017, pp. 1-11.

"On bandwidth parts", 3GPP TSG-RAN WG1 #90, R1-1712953, Prague, Czech Republic, Aug. 21-25, 2017, pp. 1-4.

"On four-step RACH procedure", 3GPP TSG RAN WG1 Meeting #90, R1-1713131, Prague, Czech Republic, Aug. 21-25, 2017, pp. 1-6.

"Remaining Details on Bandwidth Part Operation in NR", 3GPP TSG RAN WG1 Meeting 90bis, R1-1718327, Prague, CZ, Oct. 9-13, 2017, pp. 1-13.

"UL BWP ambiguilty during RAR reception", 3GPP TSG-RAN WG2 NR Ad hoc 1801, R2-1801272, Vancouver, Canada, Jan. 22-Jan. 26, 2018, pp. 1-4.

* cited by examiner

| PRACH configuration index | DL BWP |
|---|---|
| 0 to 10 | DL BWP1 |
| 11 to 14 | DL BWP1 or DL BWP2 |
| 15 to 23 | DL BWP3 |
| 24 to 63 | DL BWP2 or DL BWP3 |

Fig. 3

| Set of Preambles/Resources | DL BWP |
|---|---|
| 0 | DL BWP1 |
| 1 | DL BWP1 or DL BWP2 |
| 2 | DL BWP3 |
| 3 | DL BWP2 or DL BWP3 |

Fig. 4

| UL BWP | DL BWP |
|---|---|
| UL BWP1 | DL BWP1 |
| UL BWP2 | DL BWP1 or DL BWP2 |
| UL BWP3 | DL BWP3 |

Fig. 5

RANDOM ACCESS PROCEDURE

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The evolving 5G standard NR (New Radio) is aiming to operate in a wide range of frequencies from below 1 GHz up to 100 GHz. In such a frequency range, the random access procedure in NR may be improved to mitigate the potential propagation losses at high frequency carriers.

For NR, there is an ongoing discussion in the 3 gpp standardization on the use of Band Width Parts (BWPs). BWPs are a subset of contiguous physical resources within a carrier. The reasons for using BWPs are that some wireless devices might not be able to use the entire bandwidth, for example narrowband internet of things (NB-IoT) devices. Such devices may be assigned a smaller section of bandwidth, a BWP, which they are capable of handling. Another reason for using BWPs may be for providing battery savings. A wireless may be assigned a BWP rather than an entire BW in order to reduce the energy needed for reception and transmission. Yet another reason for using BWPs may be for load balancing when the wireless devices do not need the entire BW to meet the bit rate requirements.

So far, it has been agreed that each wireless device may be assigned with at least an initial BWP (which may be the same for all wireless devices and may be narrow enough for all wireless devices to handle) and a default BWP. The default BWP may be the same as the initial BWP but may also be different (i.e. different wireless devices will typically have different default BWPs). In addition to an initial and a default BWP, each wireless device may be configured with additional BWPs that may be used in different circumstances. In some examples, a wireless device may be configured to use up to four different DL and four different UL BWPs. In some examples, any point in time, only one BWP is active for a specific wireless device.

The wireless device may be configured with different BWPs by receipt of radio resource control (RRC) signaling. In some examples the different BWPs may be configured in minimum System Information (SI). The initial BWP may be preconfigured in the wireless device. Switching between BWPs may be controlled by Downlink Control Information (DCI) on the Physical Downlink Control Channel (PDCCH). There is also a possibility for a wireless device to be configured to switch to the default BWP when a timer, e.g. bwp-InactivityTimer expires.

A configured uplink (UL) BWP may comprise random access resources, i.e. Physical Random Access Channel (PRACH) resources which may be used to transmit random access requests. However, there may also be UL BWPs which do not comprise random access resources, in which case the wireless device may switch to another UL BWP which does comprise random access resources in order to perform a random access procedure. Also for Physical Uplink Control Channel (PUCCH) a BWP may or may not have PUCCH resources configured. The reason for not having a PUCCH configured is that the PUCCH resources occupy resources within the BWP which may lead to excess overhead (especially in configured but not active BWPs).

FIG. 1 illustrates an example of a Random Access Procedure.

There currently exist certain challenge(s). FIG. 1 illustrates an example of a random access procedure. In step 100 the wireless device selects one of a plurality of PRACH contention-free signatures and transmits a random access preamble, e.g. a Msg1. In some examples, there may be 64 contention free signatures from which the wireless device may randomly select.

In step 101 the base station transmits a Random Access Response (RAR), e.g. a Msg2, on the Physical Downlink Shared Channel (PDSCH). The RAR may be addressed with an ID, the Random Access Radio Network Temporary Identifier (RA-RNTI), and may identify the time-frequency slot in which the random access preamble was detected. If multiple wireless devices had collided by selecting the same signature in the same preamble time-frequency resource, they would both receive the same RAR.

In step 102 a Layer 2/Layer 3 (L2/L3) Message, e.g. a Msg3 is transmitted from the wireless device to the base station. This message is the first scheduled uplink transmission on the PUSCH and makes use of Hybrid Automatic Repeat Request (HARQ). Msg3 may also convey the wireless device identifier. Msg3 may also convey the actual random access procedure message.

In step 103 the base station transmits a contention resolution message, e.g. a Msg4. If the wireless device correctly decodes the message and detects its own identity it sends back positive acknowledgment ACK. On the other hand, if the wireless device correctly decodes the message and discovers that it contains another wireless device identity (contention resolution), it sends nothing back (Discontinuous Transmission).

FIG. 2 illustrates DL/UL BWPs from the network point of view

The issue is illustrated in FIG. 2 where there are several UL BWPs, for different wireless devices, where the UL BWPs overlap with each other. The radio access resources are configured within the overlapping region. For example, the radio access resources may be configured in the physical resource block PRB3. The UL BWP1 may comprise physical resource blocks PRB1, PRB2 and PRB3, the UL BWP2 may comprise the physical resource block PRB2, PRB3 and PRB4, and the UL BWP3 may comprise the physical resource blocks PRB2 and PRB3.

In this example, a wireless device A is configured to use UL BWP1, a wireless device B is configured to use UL BWP2 and a wireless device C is configured to use UL BWP 3.

In this example all of the illustrated UL BWPs comprise the physical resource block PRB3 which comprises the random access resources. However, it will be appreciated that in some embodiments some of the wireless devices may be configured with UL BWPs which do not comprise the random access resources. However, when initiating a random access procedure, the wireless devices may switch to a UL BWP which does comprise the random access resources.

In the downlink, wireless device A may be using DL BWP1 as its active DL BWP which comprises the physical resource block PRB5; wireless device B may be using DL BWP2 as its active DL BWP which comprises physical resource blocks PRB5 and PRB6; and wireless device C may be using DL BWP3 as its active DL BWP which comprises physical resource blocks PRB5, PRB6 and PRB7.

In this case when a wireless device (e.g. one of the wireless devices A, B or C) sends a random access preamble on its active UL BWP, the receiving base station may not be aware of which wireless device, e.g. which or wireless devices A, B or C, transmitted the random access preamble and therefore may not know in which DL BWP it should send a random access response, nor in which UL BWP uplink resources should be allocated for the wireless device to transmit a Msg3.

In this case, the base station may need to provide multiple UL grants of uplink resources in all UL BWPs that comprise random access resources, i.e. in each of UL BWP1, UL BWP2 and UL BWP3, in order for all wireless devices that could have sent the random access preamble to be able to transmit a Msg3. The random access response (RAR) message may also need to be transmitted on all DL BWPs so that all wireless devices that could have sent the random access preamble would be able to receive the RAR. However, this solution is not efficient in terms of both the resource utilization and the latency.

Certain aspects of the present disclosure and their embodiments may provide solutions to these or other challenges. Embodiments disclosed herein address the aforementioned issue where there are multiple wireless devices sharing the same random access resources to transmit random access preambles, where these UEs may belong to different UL BWPs or/and DL BWPs. In this case, we propose a method to define an association between DL BWPs and PRACH configurations. With this method, the base station may only transmit random access responses on one or more configured DL BWP(s) associated with either the physical random access configuration used to transmit the preamble, or the UL BWP that the wireless device used to transmit the random access preamble.

SUMMARY

There are, proposed herein, various embodiments which address one or more of the issues disclosed herein.

According to some embodiments there is provided a method performed by a wireless device for performing a random access procedure to access a wireless communications network. The method comprises responsive to transmitting a first random access preamble to a base station using first random access resources in an uplink, UL, bandwidth part, BWP, of a carrier selecting, based on an association, a first downlink, DL, BWP of the carrier. The association maps a plurality of DL BWPs of the carrier to different values of a parameter related to physical random access configurations and/or to different UL BWPs of the carrier. The method further comprises monitoring the first DL BWP in order to receive a random access response from the base station.

According to some embodiments there is provided a method performed by a base station for performing a random access procedure. The method comprises receiving from a wireless device, a first random access preamble on first random access resources and selecting based on an association, one or more DL BWPs. The association maps a plurality of DL BWPs of a carrier to different values of a parameter related to physical random access configurations and/or to different UL BWPs of the carrier. The method further comprises transmitting a respective random access response message using resources in each of the one or more DL BWPs.

Certain embodiments may provide one or more of the following technical advantage(s). In particular, embodiments disclosed herein reduce the resources required in both UL and DL for performing the random access procedure by reducing the number of RAR transmissions needed in case wireless devices with different active DL BWPs share the same PRACH resources, and by reducing the number of granted uplink resources for Msg3 in case several wireless devices with different active UL BWPs share the same PRACH resources.

BRIEF DESCRIPTION OF THE DRAWINGS

FIG. 3 illustrates an example of an association which maps a plurality of DL BWPs to different physical random access configurations indexes;
FIG. 4 illustrates an example of an association which maps a plurality of DL BWPs to different sets of preambles or resources;
FIG. 5 illustrates an example of an association which maps a plurality of DL BWPs to different sets of UL BWPs.

DESCRIPTION

Figure 1:
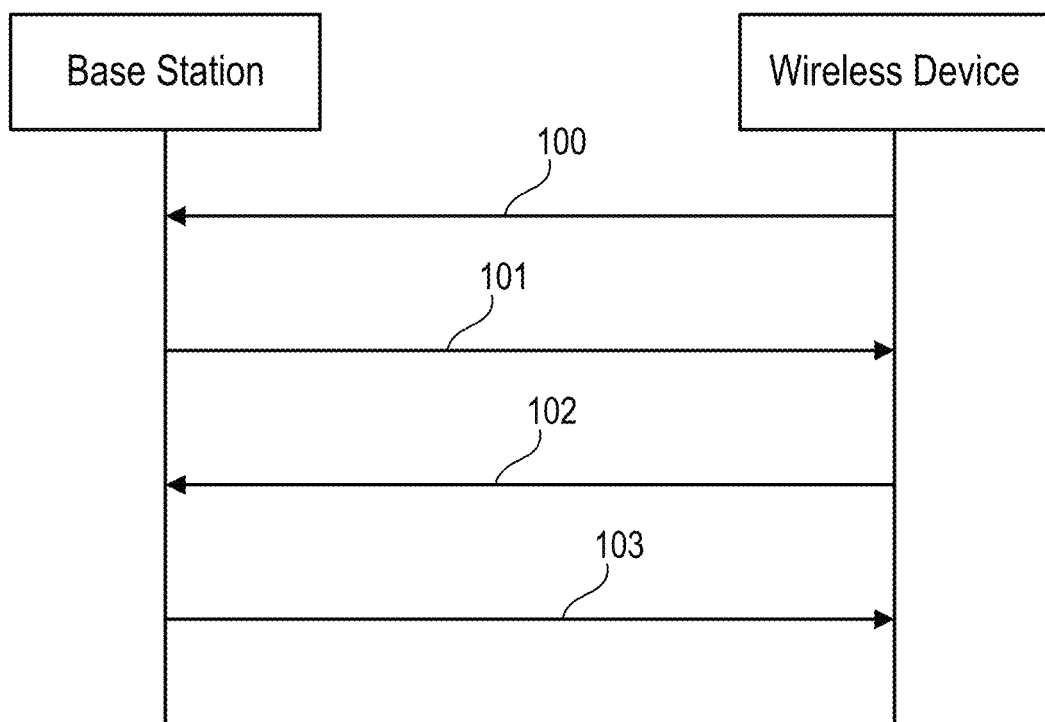
FIG. 1 illustrates an example random access procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

There are multiple embodiments described below to explain the details of the invention.

For example, a wireless device may perform a random access procedure to access a wireless communications network. To do this, as described above with reference to FIG. 1 the wireless device may send a random access preamble, e.g. Msg1 to a base station. As described previously, where the wireless device is configured to use an UL BWP, it may either use random access resources within the active UL BWP to transmit the random access preamble, or may switch to a different UL BWP which comprises random access resources to transmit the random access preamble if the current active UL BWP does not comprise random access resources.

Responsive to transmitting a first random access preamble to a base station using first random access resources in an uplink, UL, bandwidth part, BWP, of a carrier the wireless device may then select, based on an association, a first downlink, DL, BWP of the carrier. The wireless device may then monitor the first DL BWP in order to receive a random access response from the base station, e.g. to receive a Msg2 as described with respect to FIG. 1.

The association may be a predetermined or preconfigured association which maps a plurality of DL BWPs of the carrier to different values of a parameter related to physical random access configurations and/or to different UL BWPs of the carrier.

FIG. 3 illustrates an example of an association which maps a plurality of DL BWPs to different physical random access configurations indexes.

In this example, DL BWP1 is mapped to the physical random access configurations with index 0 to 10 or with index 11 to 14. DL BWP2 is mapped to the PRACH configurations with index 11 to 14 or 24 to 63. DL BWP3 is mapped to the PRACH configurations with index 15 to 23 or 24 to 63. It will be appreciated that FIG. 3 is an example of an association and that any suitable mapping may be used.

In this example, the parameter comprises an index of a physical random access channel configuration. The wireless device may therefore determine a first index of a first physical random access channel configuration used to transmit the random access preamble, and may select the first DL BWP from one or more DL BWPs mapped to the first index in the association. In other words, if for example, the first index is 12, the wireless device may select the first DL BWP from DL BWP1 and DL BWP2. Alternatively, if the first index is 21 the wireless device may select DL BWP3 as the first DL BWP as this is the only DL BWP available in the association for a PRACH configuration index of 21.

In some examples, indices of DL BWPs are added to the PRACH configuration structures, for example using RACH-ConfigCommon and RACH-ConfigDedicated in the RRC spec. Each index may indicate a DL BWP on which the RAR will be transmitted when the particular PRACH configuration is used.

In some examples, a set of preambles may be associated with an index, or a set of resources may be associated with an index. This index may then be mapped to DL BWPs.

FIG. 4 illustrates an example of an association which maps a plurality of DL BWPs to different sets of preambles or resources.

In this example, DL BWP1 is mapped to the preambles or resources with index 0 or with index 1. DL BWP2 is mapped to the preambles or resources with index 1 or with index 3. DL BWP3 is mapped to the preambles or resources with index 2 or with index 3. It will be appreciated that FIG. 4 is an example of an association and that any suitable mapping may be used.

Figure 2:
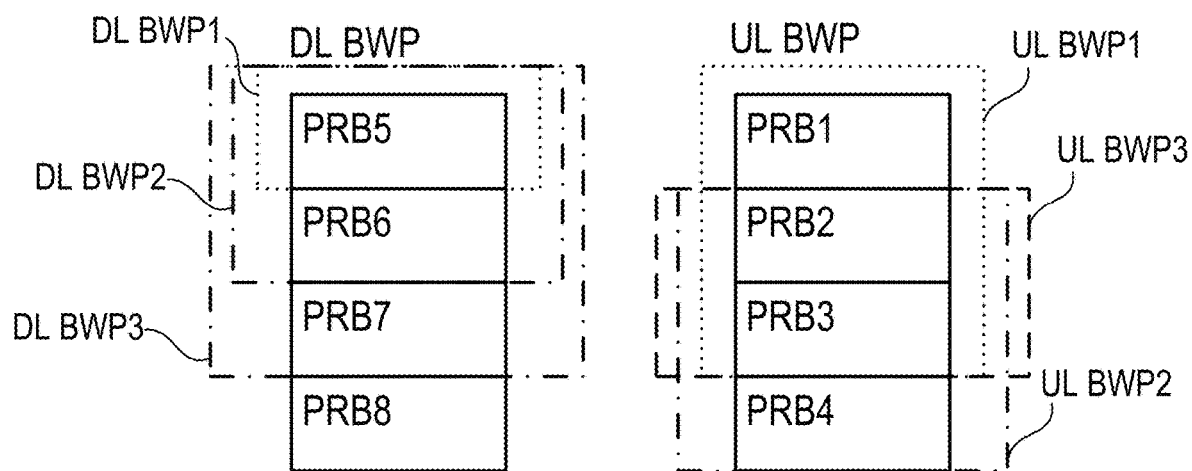
FIG. 2 illustrates DL/UL BWPs from the network point of view.

In some examples, the parameter comprises an indication of a set of random access resources. The wireless device may therefore select the first DL BWP from one or more DL BWPs mapped to the first random access resources in the association. For the example in FIG. 2, the random access resources are in PRB3. If for example, PRB3 is in the set of resources associated with index 3, the wireless device may select the first DL BWP from DL BWP2 and DL BWP3. Alternatively, if PRB3 is in the set of resources associated with index 0, the wireless device may select DL BWP1 as the first DL BWP.

In some examples, the parameter comprises an indication of a set of random access preambles. The wireless device may therefore select the first DL BWP from one or more DL BWPs mapped to the first random access preamble in the association. For example, if the first random access preamble used is in the set of preambles associated with index 3, the wireless device may select the first DL BWP from DL BWP2 and DL BWP3. Alternatively, if the first random access preamble is in the set of resources associated with index 0, the wireless device may select DL BWP1 as the first DL BWP.

In some examples, this index associated with the set of resources or set of preambles can be a new index associated with a set of preambles or a set of PRACH resources. In each downlink BWP configuration structure, an indicator may be added to indicate whether a PRACH configuration is enabled or disabled in the associated downlink BWP.

FIG. 5 illustrates an example of an association which maps a plurality of DL BWPs to different sets of UL BWPs.

In some embodiments, as illustrated in FIG. 5, the association maps one or more DL BWPs to each of a plurality of UL BWPs. Each UL BWP where PRACH resources are available is linked to one or multiple DL BWPs.

In this example, DL BWP1 is mapped to UL BWP1 and UL BWP2. DL BWP2 is mapped to UL BWP2. DL BWP3 is mapped to UL BWP3. It will be appreciated that FIG. 5 is an example of an association and that any suitable mapping may be used.

In this example, the wireless device may therefore select the first DL BWP from one or more DL BWPs mapped to the UL BWP used to transmit the random access preamble. If for example, the wireless device is using UL BWP2, the wireless device may select the first DL BWP from DL BWP1 and DL BWP2. Alternatively, the wireless device is using UL BWP3 the wireless device may select DL BWP3 as the first DL BWP.

When a wireless device initiates a random access procedure using a selected PRACH configuration/resource on the current active UL BWP, the wireless device therefore determines one or more DL BWPs indicated by the association based on either the PRACH configuration or resources, or the current active UL BWP.

After the transmission of the random access preamble, the wireless device switches to one of the determined one or more DL BWPs to monitor for a RAR. In some examples, the wireless device monitors the first DL BWP for a predetermined time period (e.g., the duration of RAR window, or an additional configured timer), and responsive to the predetermined time period elapsing, the wireless device may switch back to the previous active BWP for possible data reception.

In some examples, the wireless device may monitor both its active DL BWP, and one or more BWPs that are associated to the PRACH configuration, the PRACH resources or the UL BWP used for the preamble transmission.

The selection of the first DL BWP for RAR monitoring may be performed in several ways. In one example, responsive to the one or more DL BWPs comprising an active DL BWP which the wireless device is configured to monitor for data reception, the wireless device may select the active DL BWP as the first DL BWP. In this example therefore the wireless device does not switch DL BWP in order to monitor for receipt of a RAR.

In some examples, the wireless device randomly selects one of the one or more configured DL BWPs for RAR monitoring.

In yet another example, the wireless device selects the first DL BWP based on a bandwidth capability of the wireless device. For example the wireless device may only be able to monitor a certain bandwidth size of DL BWP and may therefore select the first DL BWP from the one or more DL BWP based on the size of the one or more DL BWPs.

In one further example, the wireless device may monitor multiple DL BWPs at the same time for RAR reception. For example, the wireless device may select more than one first DL BWP to monitor for RAR reception.

The UE may also monitor DL BWPs for reception of a RAR on the one or more DL BWPs sequentially. For example, the wireless device first monitors one DL BWP, if there is no RAR received for a given time period, the UE moves to next DL BWP. For example, the wireless device may monitor the first DL BWP for a predetermined time period; and responsive to the predetermined time period elapsing may select a second DL BWP based on the association, and may monitor the second DL BWP.

A base station may also perform a random access procedure. For example, the base station may receive from a wireless device, a first random access preamble on first random access resources. For example, the base station may receive a Msg1 as illustrated in FIG. 1.

The base station may then select based on an association, one or more DL BWPs and may transmit a respective random access response message using resources in each of the one or more DL BWPs. In other words, the base station may transmit a RAR on each of the one or more DL BWPs.

As previously described the association may map a plurality of DL BWPs of a carrier to different values of a parameter related to physical random access configurations and/or to different UL BWPs of the carrier.

Therefore, in embodiments where the association links the PRACH configuration index used to transmit the preamble with one or more DL BWPs, the base station can determine, from the PRACH configuration index of the received random access preamble, one or more DL BWPs that the wireless device that sent the transmission will be monitoring for receipt of the RAR. The base station may therefore transmit RARs in each of the determined one or more DL BWPs.

For the example illustrated in FIG. 3, if the PRACH configuration of the received random access preamble has an index of 12, the base station may transmit a RAR in DL BWP2 and DL BWP3 as the wireless device may be monitoring one or both of these DL BWPs.

In some examples, the parameter comprises an indication of a set of random access preambles as illustrated in FIG. 4.

The base station may therefore select the one or more DL BWPs mapped to the first random access preamble in the association. For example, if the first random access preamble falls within the set of preambles indicated by index 1, the base station may transmit RARs to both DL BWP1 and DL BWP2.

In some examples, the parameter comprises an indication of a set of random access resources as illustrated in FIG. 4. The base station may therefore select the one or more DL BWPs mapped to the first random access resources in the association. For example, if the first random access resources fall within the set of resources indicated by index 1, the base station may transmit RARs to both DL BWP1 and DL BWP2.

In embodiments where the association maps the one or more DL BWPs to the UL BWP that was used when the preamble was transmitted, as illustrated in FIG. 5, the base station may detect on which UL BWP the random access preamble was initiated. For example, the base station may detect on which UL BWP the random access preamble was transmitted, based on beam forming based reception. In other words, in some examples, the UL BWPs may be assigned to wireless devices based on their location. The base station may then be able to deduce based on beam forming, a location of the wireless device, and from the location, which UL BWP the wireless device is used. The base station may then transmit a RAR in each DL BWP linked to the detected UL BWP in the association.

For example, if the UL BWP2 is detected, the base station may transmit RARs on DL BWP1 and DL BWP2 as the wireless device may be monitoring one or both of these DL BWPs.

The base station, when transmitting the RAR includes an indication of uplink resources that the receiving wireless device may utilize to transmit the Msg3, as illustrated in FIG. 1. However, as previously explained, the base station may not be aware of which UL BWP is the active UL BWP. For example, if a random access preamble is transmitted using physical resource block PRB3, the base station may not be able to differentiate between UL BWP1, UL BWP2 and UL BWP3. The base station may therefore not know whether or not it can schedule uplink resources in PRB4, as the receiving wireless device may be operating in UL BWP1, or UL BWP3 which do not comprise PRB4.

The base station may therefore indicate in the each random access response a respective set of uplink resources for each of one or more UL BWPs which comprise the random access resources. In other words, the each random access response message may specify, for the example illustrated in FIG. 2, PRB1 for UL BWP1, PRB4 for UL BWP2, and PRB2 for UL BWP3.

In some examples, the Medium Access Control (MAC) Payload Data Units (PDU) which carry the RAR message may comprise multiple MAC payloads (RARs) for Random Access Response. Each MAC payload may carry an uplink grant associated with an UL BWP. All these RARs may use a single MAC-subheader (carrying a new specified Logical Channel ID (LCID) indicating that there are multiple MAC payloads are associated with this LCID). In this case, a new LCID may be introduced. The RAR may in this example carry grants for all the possible UL BWPs that share the PRACH resource on which the preamble was transmitted.

In some examples, the MAC PDU which carries the RAR message carries only one RAR. In this RAR, multiple UL grants are included. Each grant is associated with a specific UL BWP. Also in this example, the RAR may carry grants for all the possible UL BWPs that share the PRACH resource on which the preamble was transmitted.

In both choices, the index of each UL BWP which is associated with the uplink grant of resources may be also included.

Figure 6:
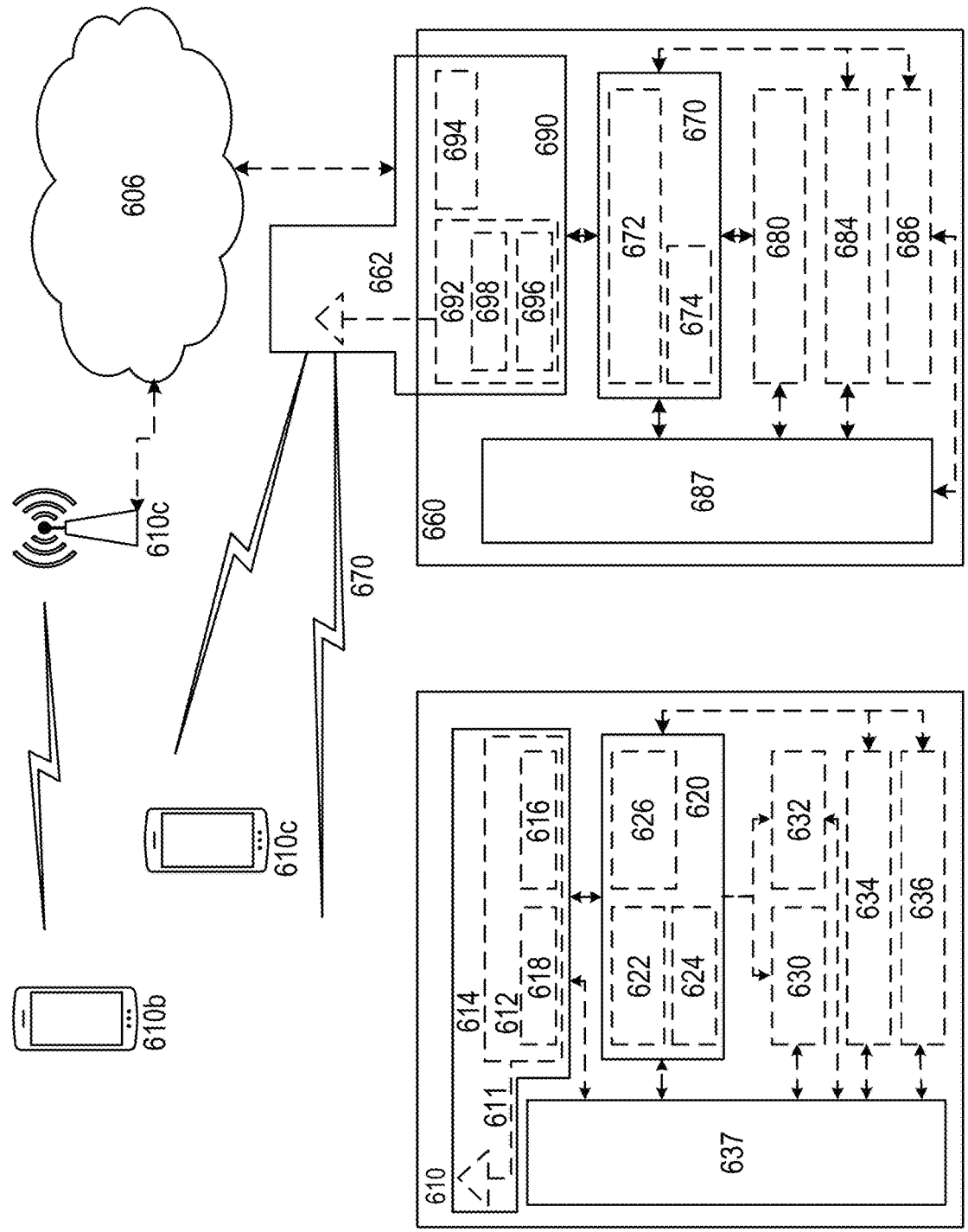
FIG. 6 illustrates a wireless network in accordance with some embodiments.

FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614.

Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
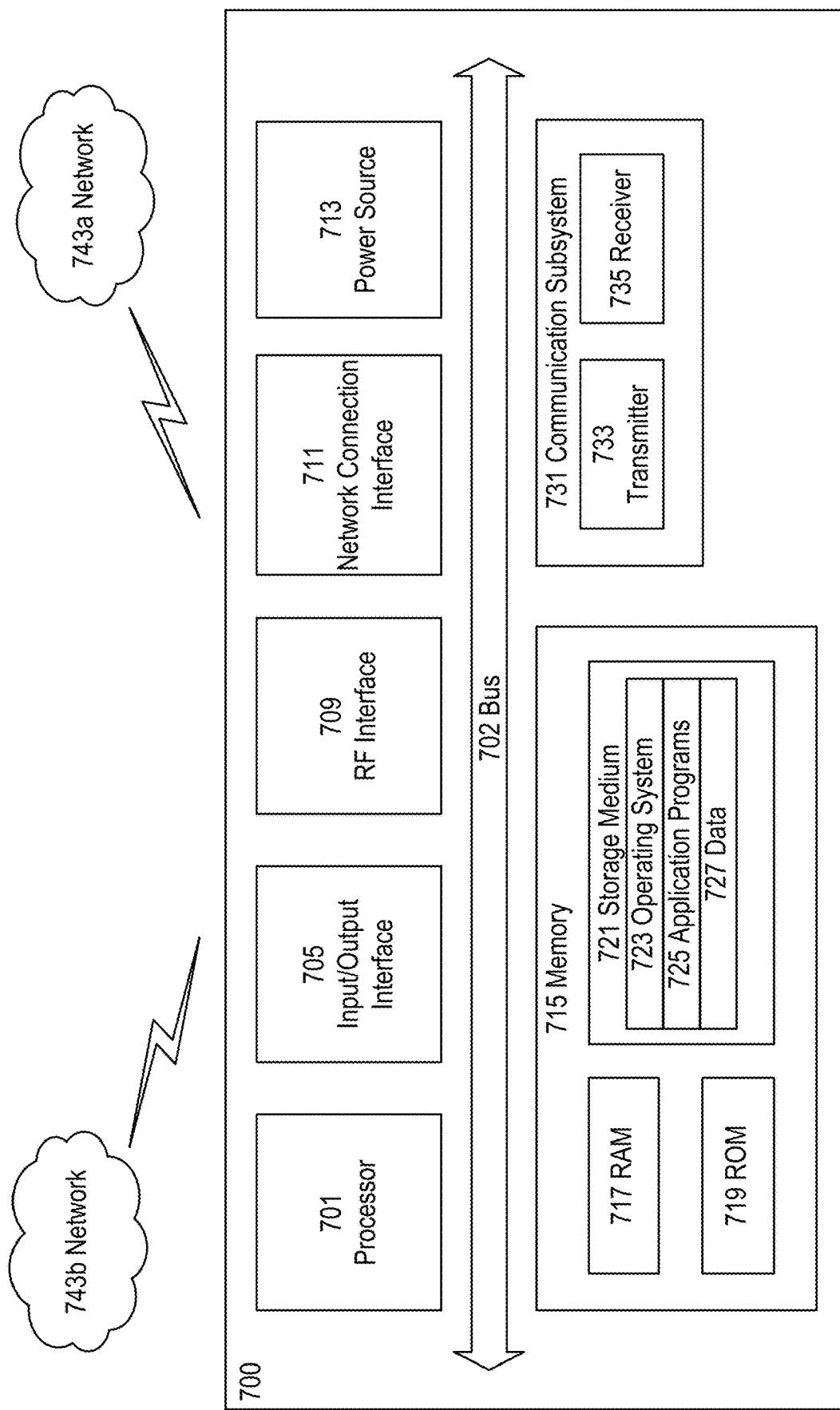
FIG. 7 illustrates a User Equipment in accordance with some embodiments.

FIG. 7 illustrates a User Equipment in accordance with some embodiments

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
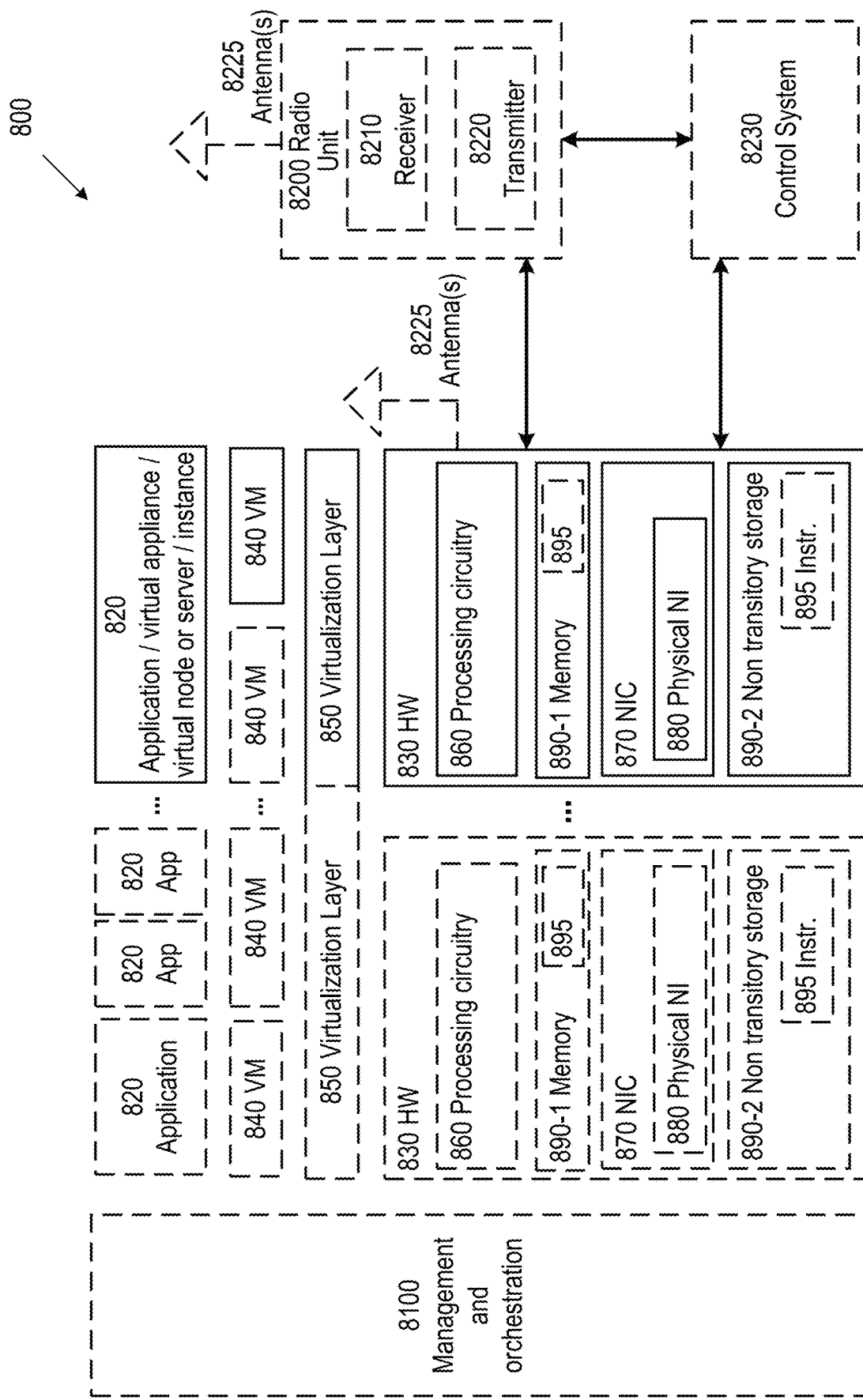
FIG. 8 illustrates a virtualization environment in accordance with some embodiments.

FIG. 8 illustrates a virtualization environment in accordance with some embodiments FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
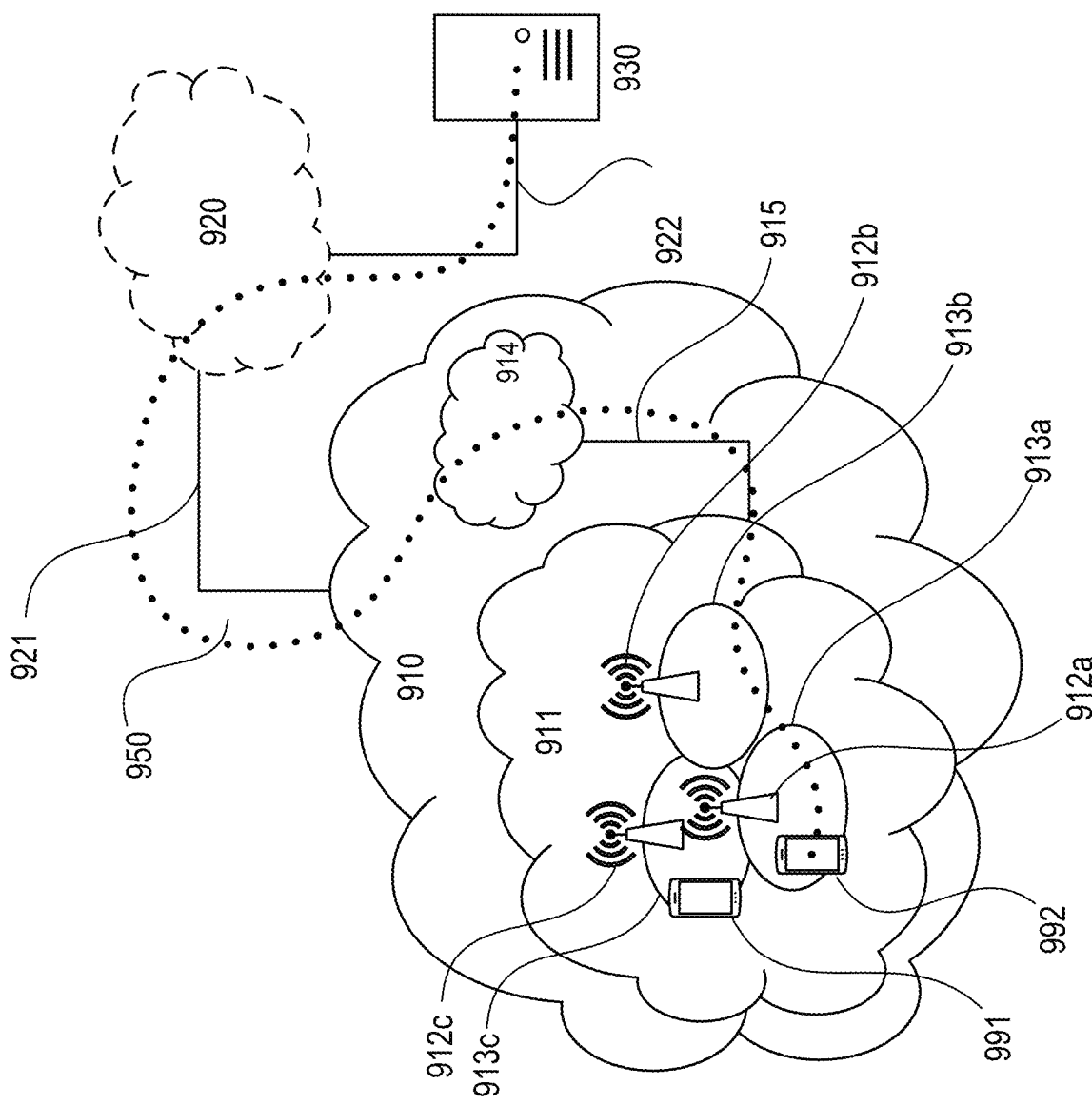
FIG. 9 illustrates a telecommunication network connected via an intermediate network to a host computer in accordance with some embodiments.

FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 10:
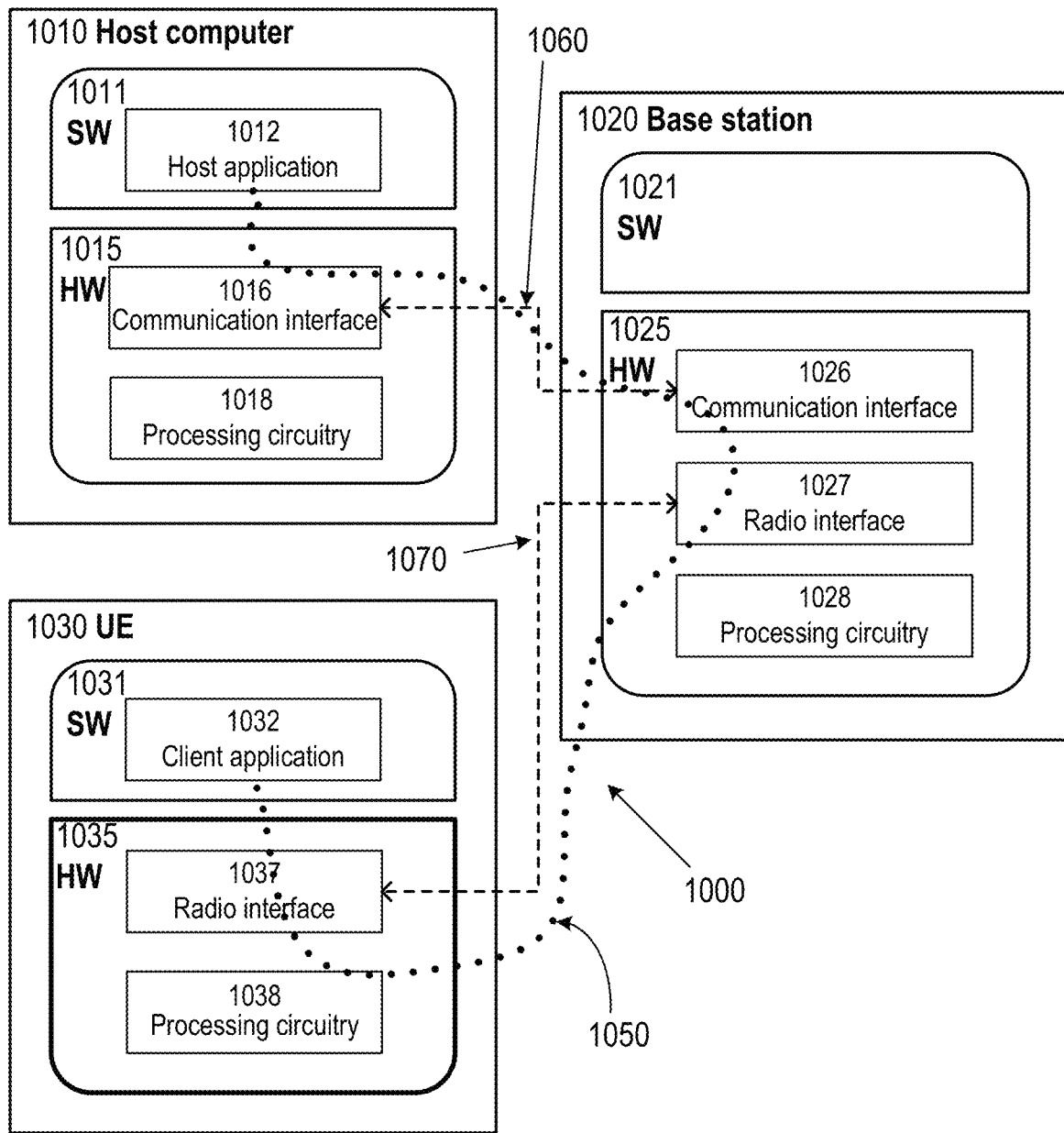
FIG. 10 illustrates a Host computer communicating via a base station with a user equipment over a partially wireless connection in accordance with some embodiments.

FIG. 10 illustrates a Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may reduce the resources required to perform a random access procedure, and thereby provide benefits such as reduced power consumption.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
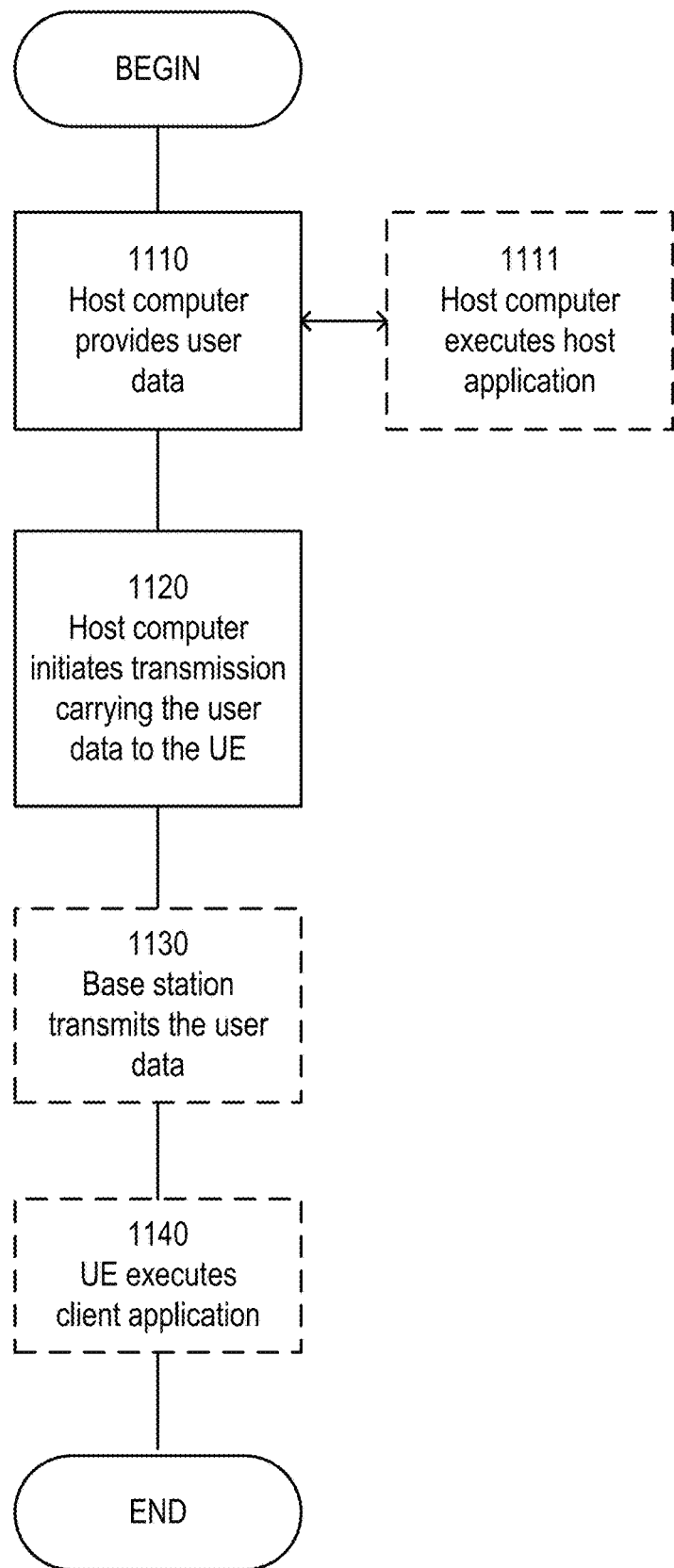
FIG. 11 illustrates methods implemented in a communication system including a host computer, a base station and a user equipment in accordance with some embodiments.

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
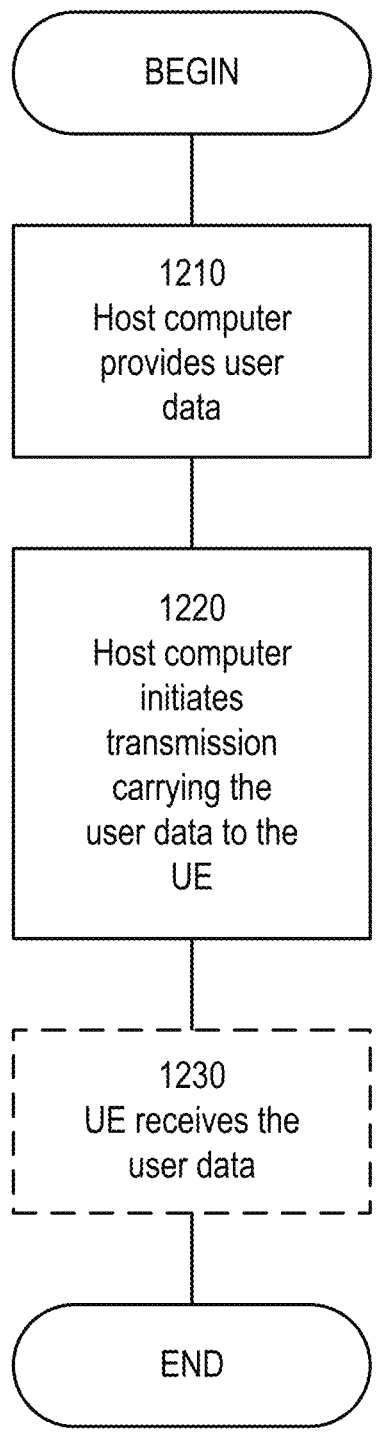
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
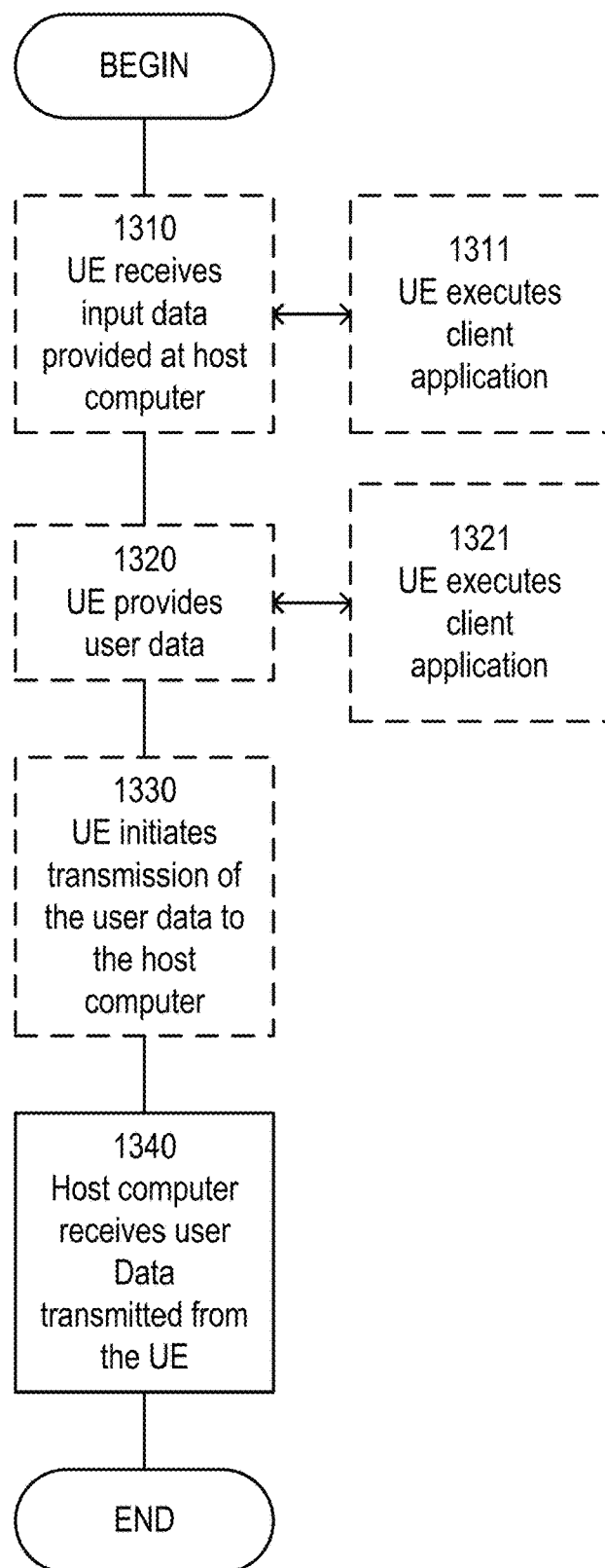
FIG. 13 illustrates methods implemented in a communication system including a host computer, a base station and a user equipment in accordance with some embodiments.

FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
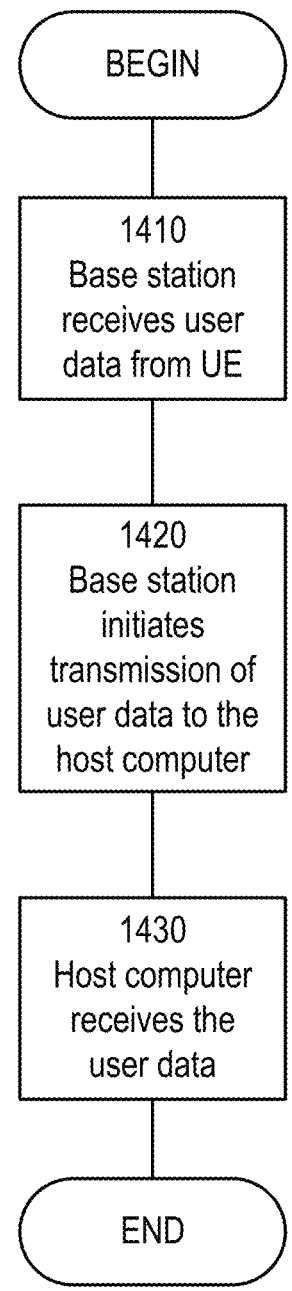
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 15:
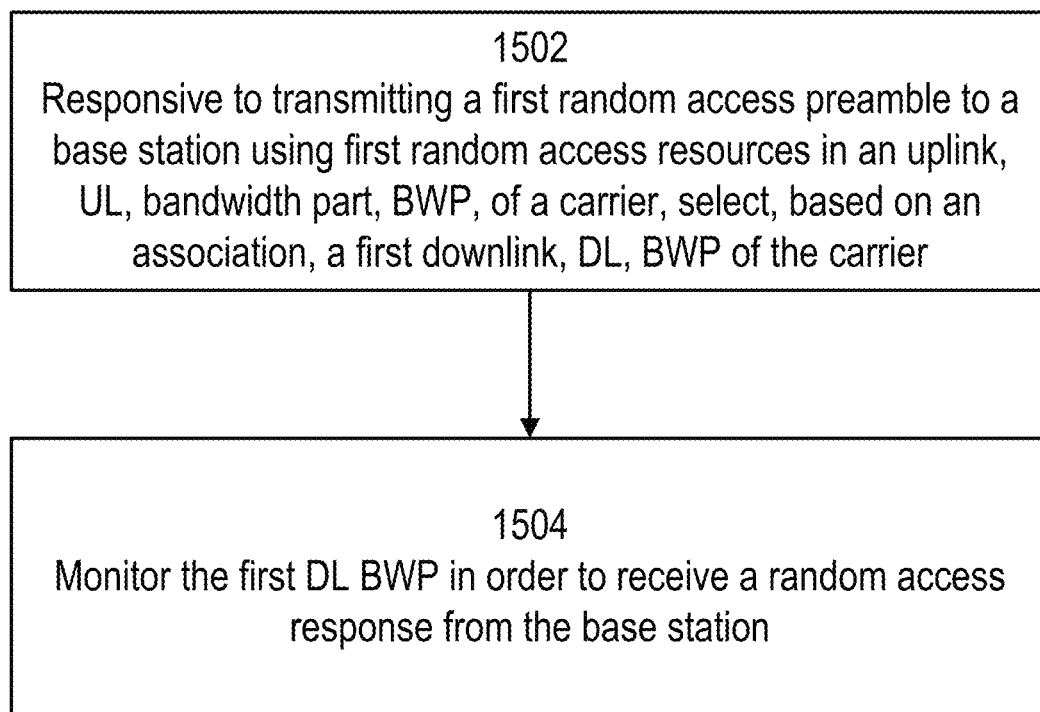
FIG. 15 illustrates a method in accordance with some embodiments.

FIG. 15 illustrates a method in accordance with some embodiments.

FIG. 15 depicts a method in accordance with particular embodiments, the method begins at step 1502 with responsive to transmitting a first random access preamble to a base station using first random access resources in an uplink, UL, bandwidth part, BWP, of a carrier: selecting, based on an association, a first downlink, DL, BWP of the carrier, wherein the association maps a plurality of DL BWPs of the carrier to different values of a parameter related to physical random access configurations and/or to different UL BWPs of the carrier. In step 1504 the method comprises monitoring the first DL BWP in order to receive a random access response from the base station.

Figure 16:
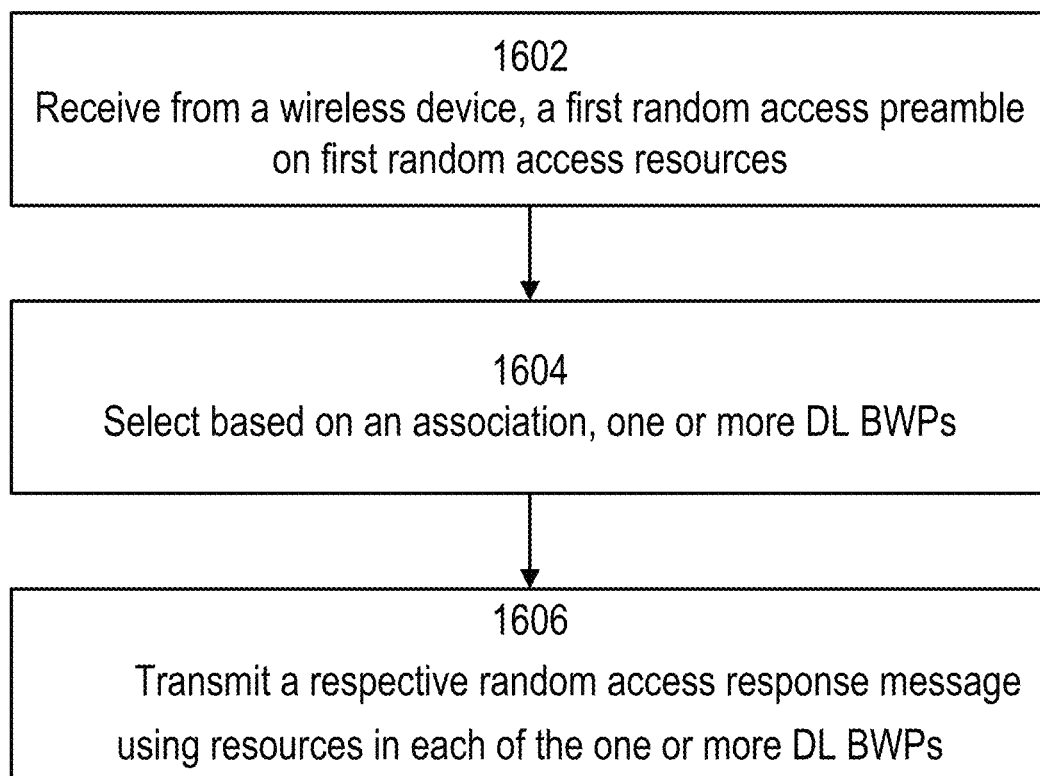
FIG. 16 illustrates a method in accordance with some embodiments.

FIG. 16 illustrates a method in accordance with some embodiments.

FIG. 16 depicts a method in accordance with particular embodiments, the method begins at step 1602 with receiving from a wireless device, a first random access preamble on first random access resources. In step 1604 the method comprises selecting based on an association, one or more DL BWPs, wherein the association maps a plurality of DL BWPs of a carrier to different values of a parameter related to physical random access configurations and/or to different UL BWPs of the carrier. In step 1606 the method comprises transmitting a respective random access response message using resources in each of the one or more DL BWPs.

Figure 17:
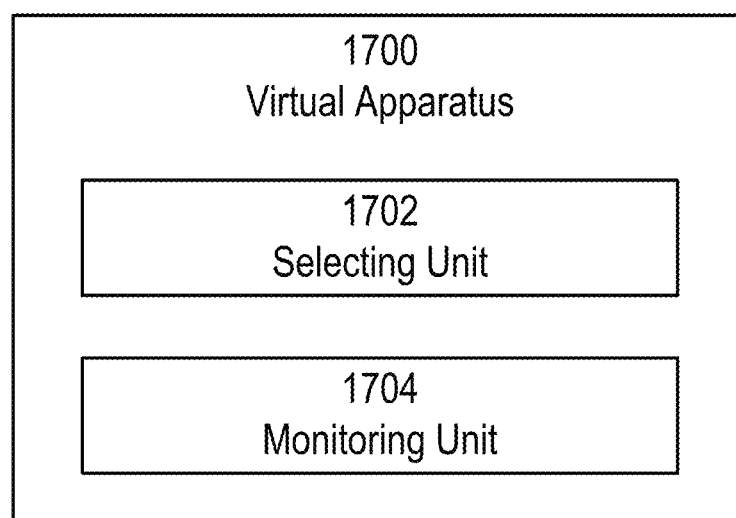
FIG. 17 illustrates a virtualization apparatus in accordance with some embodiments.

FIG. 17 illustrates a virtualization apparatus in accordance with some embodiments FIG. 17 illustrates a schematic block diagram of an apparatus 1700 in a wireless network (for example, the wireless network shown in FIG. 6). The apparatus may be implemented in a wireless device or network node (e.g., wireless device 610 or network node 660 shown in FIG. 6). Apparatus 1700 is operable to carry out the example method described with reference to FIG. 15 and possibly any other processes or methods disclosed herein. It is also to be understood that the method of FIG. 15 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause selecting unit 1702 and monitoring unit 1704, and any other suitable units of apparatus 1700 to perform corresponding functions according one or more embodiments of the present disclosure.

As illustrated in FIG. 17, apparatus 1700 includes selecting unit 1702 and monitoring unit 1704. Selecting unit 1702 is configured to responsive to transmitting a first random access preamble to a base station using first random access resources in an uplink, UL, bandwidth part, BWP, of a carrier select, based on an association, a first downlink, DL, BWP of the carrier. Monitoring unit 1704 is configured to monitor the first DL BWP in order to receive a random access response from the base station.

Figure 18:
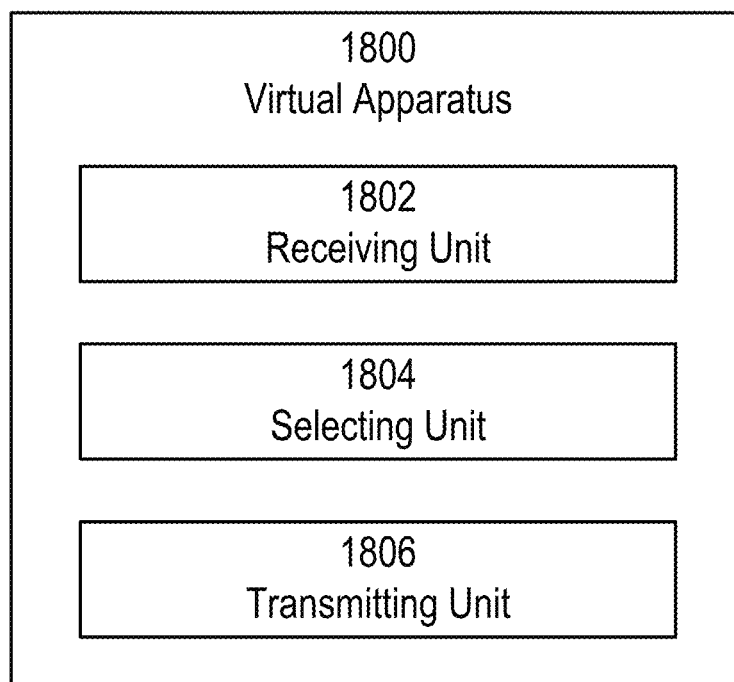
FIG. 18 illustrates a virtualization apparatus in accordance with some embodiments.

FIG. 18 illustrates a virtualization apparatus in accordance with some embodiments.

FIG. 18 illustrates a schematic block diagram of an apparatus 1800 in a wireless network (for example, the wireless network shown in FIG. 6). The apparatus may be implemented in a wireless device or network node (e.g., wireless device 610 or network node 660 shown in FIG. 6). Apparatus 1800 is operable to carry out the example method described with reference to FIG. 16 and possibly any other processes or methods disclosed herein. It is also to be understood that the method of FIG. 16 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause selecting unit 1802 and monitoring unit 1804, and any other suitable units of apparatus 1800 to perform corresponding functions according one or more embodiments of the present disclosure.

As illustrated in FIG. 18, apparatus 1800 includes receiving unit 1802, selecting unit 1804 and transmitting unit 1806. Receiving unit 1802 is configured to receive from a wireless device, a first random access preamble on first random access resources. Selecting unit 1804 is configured to select based on an association, one or more DL BWPs, wherein the association maps a plurality of DL BWPs of a carrier to different values of a parameter related to physical random access configurations and/or to different UL BWPs of the carrier. Transmitting unit 1806 is configured to transmit a respective random access response message using resources in each of the one or more DL BWPs.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

There is therefore provided methods and apparatus for providing a random access procedure according to embodiments herein. In particular the methods and apparatus provided herein are for use with wireless devices configured with UL and DL BWPs.

EMBODIMENTS

Group A Embodiments

1. A method performed by a wireless device for performing a random access procedure to access a wireless communications network, the method comprising:
   responsive to transmitting a first random access preamble to a base station using first random access resources in an uplink, UL, bandwidth part, BWP, of a carrier:
   i. selecting, based on an association, a first downlink, DL, BWP of the carrier, wherein the association maps a plurality of DL BWPs of the carrier to different values of a parameter related to physical random access configurations and/or to different UL BWPs of the carrier; and
   ii. monitoring the first DL BWP in order to receive a random access response from the base station.
2. The method as in embodiment 1 wherein the parameter comprises an index of a physical random access channel configuration; and the method further comprises:
   determining a first index of a first physical random access channel configuration used to transmit the random access preamble, and
   selecting the first DL BWP from one or more DL BWPs mapped to the first index in the association.
3. The method as in embodiment 1 wherein the parameter comprises an indication of a set of random access preambles, and the method further comprises:
   selecting the first DL BWP from one or more DL BWPs mapped to the first random access preamble in the association.
4. The method as in embodiment 11 wherein the parameter comprises an indication of a set of random access resources, and the method further comprises
   selecting the first DL BWP from one or more DL BWPs mapped to the first random access resources in the association.
5. The method as in any preceding embodiment further comprising monitoring the first DL BWP for a predetermined time period; and responsive to the predetermined time period elapsing, switching to monitoring an active DL BWP for data reception.
6. The method as in any one of embodiments 1 to 4 further comprising monitoring the first DL BWP in order to receive a random access response from the base station and simultaneously monitoring an active DL BWP for data reception.
7. The method as in embodiment 6 wherein the first BWP and the active DL BWP are the same.
8. The method as in any one of embodiments 1 to 7 wherein the step of selecting comprises:
   responsive to the one or more DL BWPs comprising an active DL BWP which the wireless device is configured to monitor for data reception, selecting the active DL BWP as the first DL BWP.

9. The method as in any one of embodiments 1 to 7 wherein the step of selecting comprises;
    selecting the first DL BWP based on a bandwidth capability associated with the wireless device.
10. The method as in any one of embodiments 1 to 9 further comprising:
    monitoring the first DL BWP for a predetermined time period; and
    responsive to the predetermined time period elapsing selecting a second DL BWP based on the association and monitoring the second DL BWP.
11. The method of any of the previous embodiments, further comprising:
    providing user data; and
    forwarding the user data to a host computer via the transmission to the base station.

Group B Embodiments

12. A method performed by a base station for performing a random access procedure, the method comprising:
    receiving from a wireless device, a first random access preamble on first random access resources;
    selecting based on an association, one or more DL BWPs, wherein the association maps a plurality of DL BWPs of a carrier to different values of a parameter related to physical random access configurations and/or to different UL BWPs of the carrier; and
    transmitting a respective random access response message using resources in each of the one or more DL BWPs.
13. The method as in embodiment 12 wherein the parameter comprises an index of a physical random access channel configuration, and the method further comprises:
    determining a first index of a first physical random access channel configuration used to transmit the random access preamble, and
    selecting one or more DL BWPs mapped to the first index in the association.
14. The method as in embodiment 12 wherein the parameter comprises an indication of a set of random access preambles, and the method further comprises:
    selecting the one or more DL BWPs mapped to the first random access preamble in the association.
15. The method as in embodiment 12 wherein the parameter comprises an indication of a set of random access resources, and the method further comprises:
    selecting the one or more DL BWPs mapped to the first random access resources in the association.
16. The method as in embodiment 12 wherein the association links the one or more DL BWPs to the UL BWP, and wherein the step of selecting comprises:
    determining using beam forming based reception, a first UL BWP that the wireless device used when transmitting the random access preamble; and
    selecting the one or more DL BWPs that the association links to the first UL BWP.
17. The method as in any one of embodiments 11 to 14 wherein each respective random access response message indicates a respective set of uplink resources for each of one or more UL BWPs which comprise the random access resources.
18. The method as in embodiment 16 wherein each respective random access response message comprises a plurality of random access responses each indicating a set of uplink resources for one of the one or more UL BWPs.
19. The method of any of the previous embodiments, further comprising:
    obtaining user data; and
    forwarding the user data to a host computer or a wireless device.

Group C Embodiments

20. A wireless device for receiving updated system information (SI) from a base station, the wireless device comprising:
    processing circuitry configured to perform any of the steps of any of the Group A embodiments; and
    power supply circuitry configured to supply power to the wireless device.
21. A base station for transmitting updated system information (SI) to a wireless device, the base station comprising:
    processing circuitry configured to perform any of the steps of any of the Group B embodiments;
    power supply circuitry configured to supply power to the base station.
22. A user equipment (UE) for receiving updated system information (SI) from a base station, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
23. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.
24. The communication system of the previous embodiment further including the base station.
25. The communication system of the previous 2 embodiments, further including the UE, wherein the UE is configured to communicate with the base station.
26. The communication system of the previous 3 embodiments, wherein:
    the processing circuitry of the host computer is configured to execute a host application, thereby providing the user data; and the UE comprises processing circuitry configured to execute a client application associated with the host application.
27. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.
28. The method of the previous embodiment, further comprising, at the base station, transmitting the user data.
29. The method of the previous 2 embodiments, wherein the user data is provided at the host computer by executing a host application, the method further comprising, at the UE, executing a client application associated with the host application.
30. A user equipment (UE) configured to communicate with a base station, the UE comprising a radio interface and processing circuitry configured to performs the of the previous 3 embodiments.
31. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
32. The communication system of the previous embodiment, wherein the cellular network further includes a base station configured to communicate with the UE.
33. The communication system of the previous 2 embodiments, wherein:
   the processing circuitry of the host computer is configured to execute a host application, thereby providing the user data; and
   the UE's processing circuitry is configured to execute a client application associated with the host application.
34. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.
35. The method of the previous embodiment, further comprising at the UE, receiving the user data from the base station.
36. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.
37. The communication system of the previous embodiment, further including the UE.
38. The communication system of the previous 2 embodiments, further including the base station, wherein the base station comprises a radio interface configured to communicate with the UE and a communication interface configured to forward to the host computer the user data carried by a transmission from the UE to the base station.
39. The communication system of the previous 3 embodiments, wherein:
   the processing circuitry of the host computer is configured to execute a host application; and
   the UE's processing circuitry is configured to execute a client application associated with the host application, thereby providing the user data.
40. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
41. A method implemented in a communication system including a host computer, a base station and a user equipment (UE), the method comprising:
   at the host computer, receiving user data transmitted to the base station from the UE, wherein the UE performs any of the steps of any of the Group A embodiments.
42. The method of the previous embodiment, further comprising, at the UE, providing the user data to the base station.
43. The method of the previous 2 embodiments, further comprising:
   at the UE, executing a client application, thereby providing the user data to be transmitted; and
   at the host computer, executing a host application associated with the client application.
44. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
45. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
46. The communication system of the previous embodiment further including the base station.
47. The communication system of the previous 2 embodiments, further including the UE, wherein the UE is configured to communicate with the base station.
48. The communication system of the previous 3 embodiments, wherein:
   the processing circuitry of the host computer is configured to execute a host application;

the UE is configured to execute a client application associated with the host application, thereby providing the user data to be received by the host computer.

49. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

50. The method of the previous embodiment, further comprising at the base station, receiving the user data from the UE.

51. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for random access to a wireless communications network, the method comprising:
    selecting a first index from a plurality of indices, wherein each index of the plurality of indices identifies or is associated with the following: one or more downlink (DL) bandwidth parts (BWPs) of a carrier, and a configuration of one or more uplink (UL) random access parameters for the carrier;
    initiating a random access to the carrier based on a first configuration of UL random access parameters identified by or associated with the first index; and
    monitoring a first DL BWP identified by or associated with the first index for a random access response from a base station of the wireless communication network.

2. The method of claim 1, wherein the first index identifies the first configuration of the one or more UL parameters, and the first DL BWP is associated with the first configuration.

3. The method of claim 2, wherein:
    the first configuration is a first physical random access channel (PRACH) configuration; and
    initiating a random access to the carrier based on the first configuration of UL random access parameters associated with the first index comprises transmitting a random access preamble based on the first PRACH configuration.

4. The method of claim 2, wherein:
    the first configuration of UL random access parameters includes a first set of random access preambles; and
    initiating a random access to the carrier based on the first configuration of UL random access parameters associated with the first index comprises transmitting a random access preamble of the first set of random access preambles identified by the first index.

5. The method of claim 2, wherein:
    the first configuration of UL random access parameters includes random access resources associated with a first UL BWP of the carrier; and
    initiating a random access to the carrier based on the first configuration of UL random access parameters associated with the first index comprises transmitting a random access preamble in at least a portion of the random access resources associated with the first UL BWP, as identified by the first index.

6. The method of claim 5, wherein:
    the random access preamble is transmitted in random access resources that are associated with a plurality of UL BWPs, including the first UL BWP; and
    the method further comprises receiving the random access response in the first DL BWP based on the monitoring, wherein the random access response includes a plurality of grants of uplink resources in the respective plurality of UL BWPs.

7. The method of claim 2, wherein:
    the first configuration of UL random access parameters includes a first UL BWP; and
    the first DL BWP is one of plurality of DL BWPs associated with the first UL BWP.

8. The method of claim 5, further comprising, after monitoring the first DL BWP for a predetermined time period without receiving a random access response, selecting a second DL BWP of the carrier and monitoring the selected second DL BWP for a random access response from the wireless communication network, wherein the second DL BWP is selected based on one of the following:
    an association between the first UL BWP and the second DL BWP, or
    the second DL BWP being an active DL BWP that the wireless device is configured to monitor for data reception.

9. The method of claim 1, wherein selecting the first index is further based on one or more of the following:
    the first DL BWP being an active DL BWP that the wireless device is configured to monitor for data reception;
    bandwidth capability of the wireless device; and
    random selection from among a plurality of DL BWPs associated with the first UL BWP.

10. The method of claim 1, further comprising monitoring an active DL BWP for data reception while monitoring the first DL BWP for the random access response.

11. A wireless device configured for random access to a wireless communications network, the wireless device comprising:
    transceiver circuitry configured to communicate with the wireless communications network; and
    processing circuitry operably coupled to the transceiver circuitry, whereby the processing circuitry and the transceiver circuitry are configured to perform operations corresponding to the method of claim 1.

12. A method performed by a base station of a wireless communication network to support random access by wireless devices to the wireless communication network, the method comprising:
    receiving a random access to a carrier from a wireless device based on a first configuration of one or more uplink (UL) random access parameters for the carrier, wherein the first configuration is identified by or associated with a first index selected by the wireless device from a plurality of indices, wherein each index of the plurality identifies or is associated with the following: one or more downlink (DL) bandwidth parts (BWPs) of the carrier, and a configuration of one or more UL random access parameters for the carrier;
    selecting one or more downlink (DL) BWPs of the carrier based on an association between the first index and the one or more DL BWPs; and
    transmitting respective one or more random access responses to the wireless device in the one or more DL BWPs associated with the first index.

13. The method of claim 12, wherein the first index identifies the first configuration of the one or more UL parameters, and the first DL BWP is associated with the first configuration.

14. The method of claim 13, wherein:
    the first configuration is a first physical random access channel (PRACH) configuration; and receiving a random access to the carrier based on the first configuration of UL random access parameters associated with the first index comprises receiving a random access preamble based on the first PRACH configuration.

15. The method of claim 13, wherein:
the first configuration of UL random access parameters includes a first set of random access preambles; and
receiving a random access to the carrier based on the first configuration of UL random access parameters associated with the first index comprises receiving a random access preamble of the first set of random access preambles identified by the first index.

16. The method of claim 13, wherein:
the first configuration of UL random access parameters includes random access resources associated with a first UL BWP of the carrier; and
receiving a random access to the carrier based on the first configuration of UL random access parameters associated with the first index comprises receiving a random access preamble in at least a portion of the random access resources associated with the first UL BWP, as identified by the first index.

17. The method of claim 16, wherein:
the random access preamble is received in random access resources that are associated with a plurality of UL BWPs, including the first UL BWP; and
each particular random access response, transmitted in a particular DL BWP, includes a plurality of grants of uplink resources in the respective plurality of UL BWPs.

18. The method of claim 16, wherein receiving the random access preamble from the wireless device in the first UL BWP of the carrier comprises:
receiving, via beamforming, the random access preamble in a beam associated with a coverage area; and
determining that the random access preamble was transmitted by the wireless device in the first UL BWP based on an association between the coverage area and the UL BWP.

19. The method of claim 13, wherein:
the first configuration of UL random access parameters includes a first UL BWP; and
the first DL BWP is one of plurality of DL BWPs associated with the first UL BWP.

20. A base station configured to support random access by wireless devices to a wireless communication network, the base station comprising:
transceiver circuitry configured to communicate with the wireless devices; and
processing circuitry operably coupled to the transceiver circuitry, whereby the processing circuitry and the transceiver circuitry are configured to perform operations corresponding to the method of claim 12.

* * * * *